United States Patent [19]

Sorensen

[11] Patent Number: 5,008,064
[45] Date of Patent: Apr. 16, 1991

[54] INJECTION-MOLDING DIMENSION-CONTROL AND CLAMP-REDUCTION

[75] Inventor: Jens O. Sorensen, Rancho Santa Fe, Calif.

[73] Assignee: Primtec, Rancho Santa Fe, Calif.

[21] Appl. No.: 361,275

[22] Filed: Jun. 5, 1989

[51] Int. Cl.⁵ .................... B29C 45/16; B29C 45/37
[52] U.S. Cl. .......................... 264/308; 264/328.9; 264/328.12; 264/328.16
[58] Field of Search .................. 264/308, 255, 328.8, 264/328.9, 328.12, 328.16; 425/552, 577

[56] References Cited

U.S. PATENT DOCUMENTS

| | | | |
|---|---|---|---|
| 3,169,689 | 2/1965 | Schwartz | 229/1.5 |
| 3,194,468 | 7/1965 | Baron | 229/1.5 |
| 3,375,554 | 3/1968 | Blumer | 249/142 |
| 3,737,272 | 6/1973 | Segmuller | 425/248 |
| 3,832,110 | 8/1974 | Hehl | 425/130 |
| 3,944,124 | 3/1976 | Hexel | 229/1.5 |
| 3,995,008 | 11/1976 | Spiegelberg | 264/328 |
| 4,140,828 | 2/1979 | Copping | 428/167 |
| 4,264,295 | 4/1981 | Hingley | 425/577 |
| 4,381,275 | 4/1983 | Sorensen | 264/328.8 |
| 4,422,995 | 12/1983 | Schad | 264/250 |
| 4,467,994 | 8/1984 | Sorensen | 249/144 |
| 4,508,676 | 4/1985 | Sorensen | 264/328.8 |
| 4,743,420 | 5/1988 | Dutt | 264/102 |
| 4,789,326 | 12/1988 | Sorensen | 425/575 |
| 4,807,775 | 2/1989 | Sorensen | 220/72 |

Primary Examiner—Jill L. Heitbrink
Attorney, Agent, or Firm—Edward W. Callan

[57] ABSTRACT

The dimensions of an injected molded hollow plastic product are controlled and the separative force exerted against mold sections during molding of the product are reduced by injecting plastic material continuously from a gate into a mold cavity having flow channels extending through the cavity region until the mold cavity is filled with said injected plastic material, with said injection being under such conditions of injection pressure, injected plastic material temperature, mold cavity temperature, flow channel length, distance between flow channels, flow channel thickness and wall thickness in a thin-cavity region between flow channels that initially injected plastic material solidifies in the thin-cavity regions to thereby stabilize one mold section in relation to the other mold section prior to the mold cavity being filled with the injected plastic material, and to thereby reduce said separative force.

20 Claims, 1 Drawing Sheet

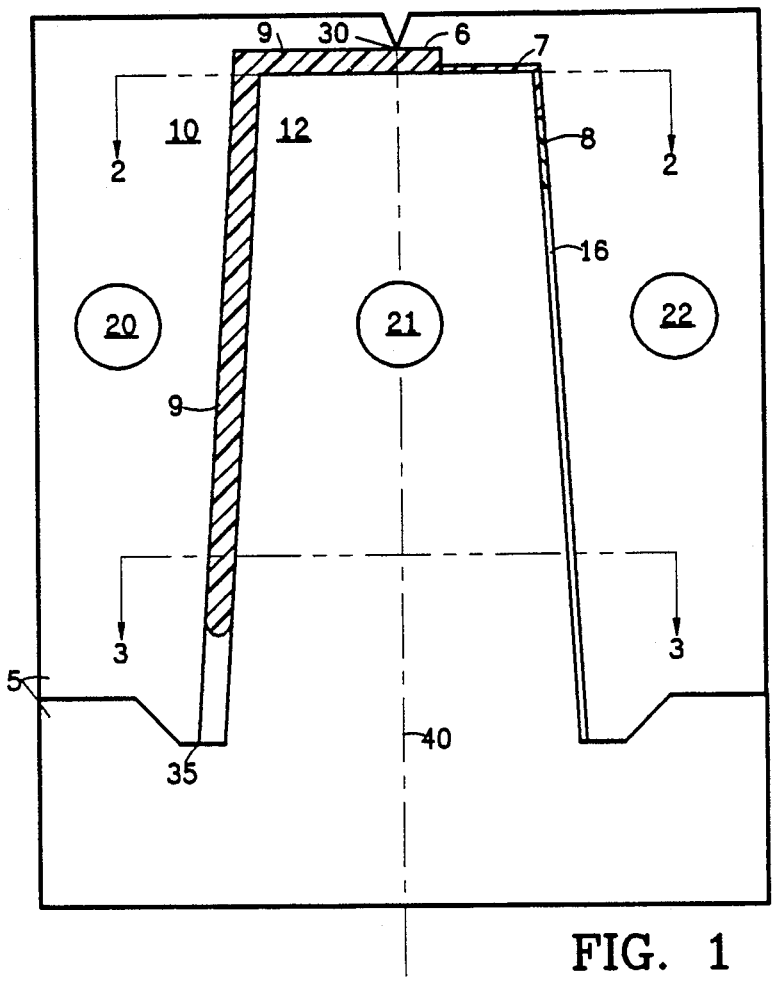
FIG. 1
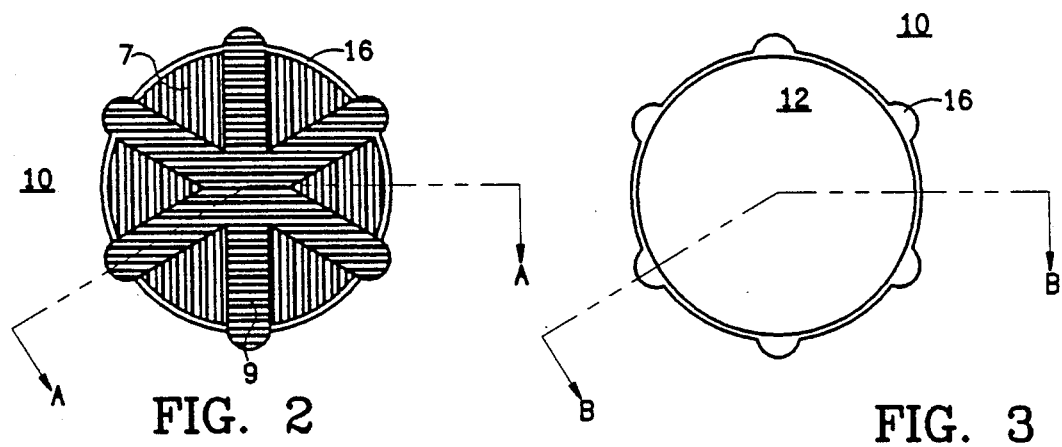
FIG. 2
FIG. 3

5,008,064

INJECTION-MOLDING DIMENSION-CONTROL AND CLAMP-REDUCTION

CROSS REFERENCE TO RELATED APPLICATION

The present invention is cross reference to copending U.S. patent application Ser. No. 07/201,690 filed Jun. 2 1988, now U.S. Pat. No. 4,867,672, issued Sep. 19, 1989 copending U.S. patent application Ser. No. 07/314,436 filed Feb. 23, 1989 and copending U.S. patent application Ser. No. 07/347,472 filed May 4, 1989.

BACKGROUND OF THE INVENTION

The present invention generally pertains to injection molding of plastic products and is particularly directed to improvement in methods of controlling the wall thickness of a plastic product while being injection molded and improvement in methods of reducing the clamping force requirements of a plastic product while being injection molded.

Prior art methods for controlling the wall thickness of a plastic product while being injection molded and for reducing the clamping force requirements of a plastic product while being injection molded are described in U.S. Pat. No. 3,375,554 to Blumer, U.S. Pat. No. 3,737,272 to Segmuller, U.S. Pat. No. 3,995,008 to Spiegelberg, U.S. Pat. No. 4,264,295 to Hingley, U.S. Pat. Nos. 4,381,275—4,467,994—4,508,676 and 4,789,326 all to Sorensen.

SUMMARY OF THE INVENTION

The present invention provides a method of controlling the dimensions of a hollow plastic product injection molded within the cavity of a mold having a core section and a cavity section defining the mold cavity therebetween and separated by a parting line, comprising stabilizing the core section in relation to the cavity section, and comprising the steps of:

(a) injecting a first plastic material into the mold cavity so that only a part of the mold cavity is filled;

(b) cooling the injected first plastic material in the mold cavity;

(c) injecting subsequent to injecting the first plastic material, a second plastic material into the mold cavity so that the cooled injected first plastic material extending between the core section and the cavity section in said part of the mold cavity is sufficiently solidified to stabilize the core section in relation to the cavity section by impeding movement of the core section in relation to the cavity section caused by injecting the second plastic material, whereby the injected second plastic material fills the mold cavity; and (d) cooling the injected plastic material in the mold cavity to thereby solidify the product; the method being characterized by the following additional steps, step (a) comprising the step of:

(e) continuing the injection of the first plastic material by the second plastic material without intermission; step (b) comprising the step of:

(f) cooling a portion of the first plastic material so that it is at least partially solidified and so that another portion of the first plastic material remains fluid; step (c) comprising the step of:

(g) injecting the second plastic material so that the second plastic material displaces some of the fluid first plastic material to thereby provide at least one flow path for the second plastic material to fill the mold cavity and so that some of the at least partially solidified first plastic material stabilizes the core section in relation to the cavity section.

The present invention also provides a method of reducing the clamping force required to produce a plastic product injection molded within the cavity of a mold having a first mold section and a second mold section defining the mold cavity therebetween and separated by a parting line, comprising (a) injecting a first plastic material into the mold cavity so that only a part of the mold cavity is filled:

(b) cooling the injected first plastic material in the mold cavity to solidify a portion of the first plastic material in a section of the mold cavity extending between the first mold section and the second mold section (c) injecting a second plastic material under pressure into the mold cavity subsequent to solidifying said portion of the first plastic material, so that the cooled injected first plastic material in said part to the mold cavity impedes transmission of injection pressure caused by injecting the second plastic material, to thereby reduce during injection of the second plastic material the clamping force required to overcome forces that tend to separate the first and second mold sections as a result of injection pressure, whereby the injected second plastic material fills the mold cavity; and (d) cooling the injected plastic material in the mold cavity to thereby solidify the product; the method being characterized by the following additional steps, step (a) comprising the step of:

(e) continuing the injection of the first plastic material by the second plastic material without intermission; step (b) comprising the step of: (f) cooling a portion of the first plastic material so that it is at least partially solidified and so that another portion of the first plastic material remains fluid; step (c) comprising the step of:

(g) injecting the second plastic material so that the second plastic material displaces some of the fluid first plastic material to thereby provide at least one flow path for the second plastic material to fill the mold cavity and so that some of the at least partially solidified first plastic material impedes transmission of injection pressure causing separative forces of the first mold section in relation to the second mold section.

Contrary to the prior art mentioned under the title "Background of the Invention" above, both methods may be executed without the help of retractable mold sections, multiple gates, temporary cavity-section-to-free-end-of-core-section contact, throttles, valves or reduced throats, and without the use of complementary shaped formations, but that is not to imply that the present invention cannot be executed in combination with one or more or such features.

BRIEF DESCRIPTION OF THE DRAWING

FIG. 1 is a sectional view of a mold used to execute the method of the invention.

FIG. 2 is a sectional view of the mold shown in FIG. 1 taken along lines 2—2.

FIG. 3 is a sectional view of the mold shown in FIG. 1 taken along lines 3—3.

The sectional view of FIG. 1 is taken along lines A—A of FIG. 2 and along lines B—B of FIG. 3.

DESCRIPTION OF THE PREFERRED EMBODIMENT

Referring to FIGS. 1, 2 and 3, the preferred embodiment of the invention includes a mold 5 with a cavity mold section 10 and a core mold part 12, shown in its assembled arrangement and defining a mold cavity 16 for forming a plastic product, not shown in its fully molded outline.

Cooling means 20, 21 and 22 are used to cool both the firstly and secondly injected plastic material. Molten plastic material may be injected into the mold cavity 16 via the gate 30. The cavity section 10 and the core section 12 are separated by a parting line 35. The mold cavity 16 may be opened along axis 40 for ejection of a molded porduct.

The methods of the preferred embodiment are executed as follows. A first plastic material 6, 7, 8, 9 is injected into the mold cavity 16 so that only a part of the mold cavity 16 is filled, a second plastic material is injected without intermission. The first plastic material has the same chemical composition as the second plastic material.

A portion of the first plastic material 7 cools before the second plastic material is injected so that it is at least partially solidified and so that another portion of the first plastic material 6, 8, 9 remains fluid.

The at least partially solidified portion of the first plastic cools very fast before a second plastic material is injected, because the wall thickness is very thin. Another portion of the first plastic material 6, 9 remains fluid because the wall thickness is relatively thick. Another portion 8 of the first plastic material also remains fluid.

Subsequent to injecting the first plastic material 6, 7, 8, 9, a second plastic material is injected into the mold cavity via the gate 30. The second plastic material displaces some of the fluid first plastic material, and thereby induces a number of flow paths 9 for the second plastic to fill the mold cavity 16.

Some of the at least partially solidified first plastic material 7 is sufficiently solidified to stabilize and support the core section 12 in relation to the cavity section 10 by impeding movement caused by injecting the second plastic material.

Some of the at least partially solidified first plastic material 7 is also sufficiently solidified to impede transmission of injection pressure in the first plastic material 7, caused by injecting the second plastic material which effect separative forces of the core mold section 12 in relation to the cavity mold section 10. The injected plastic material is then cooled to completely solidify the product.

The first plastic material is injected so that is does not completely cover the parting line, the second plastic material is injected so that it completely covers the parting line.

A mold cavity is said to be filled when the product has taken its final molded size. In this particular preferred embodiment of the invention, contrary to certain prior art methods of core steering, no retractable portion of the core section and/or the cavity section is withdrawn and no use is made of multiple gates, in order to create one or more flow path for the second plastic material to fill the mold cavity.

In other preferred embodiments of the present invention the first plastic material is injected into the mold cavity via more than one gate and the second plastic material is injected into the mold cavity via the same gates.

When the method of the invention is used only for reducing the required clamping force for the product and not for steering the core section, the method of the invention may be executed in molds which do not have a core section and a cavity section.

The product wall thicknesses shown on the drawing are increased in order to better shown the invention. The autual wall thicknesses are mormally much smaller, and depend on the type of plastic material, the temperature of the plastic material, the mold temperature, the thermal conductivity of the mold wall material, the flow distances, the injection pressure, and other molding parameters.

An example is as follows, the thin product wall thickness being 0.15 mm, the thick product wall thickness being 0.6 mm, the plastic material being polypropylene or polystyrene at a temperature of 300 degrees C., the mold temperatue being 10 degress C., the thermal conductivity of the mold being that of steel, the flow distance being about 150 mm, and the injection pressure being 2000 Bar.

The method of the present invention is particularly well suited for injection molding of products with laminated walls. In such cases the mold cavity may contain a first injected plastic product which was injected in a previous injection cycle, so that the injection of first and second plastics according to invention provides a plastic material coating of the first injected plastic product.

I claim:

1. A method of controlling the dimensions of a hollow plastic product injection molded within the cavity of a mold having a core section and a cavity section defining the mold cavity therebetween and separated by a parting line, comprising stabilizing the core section in relation to the cavity section and comprising the steps of:

(a) injecting a first plastic material into the mold cavity so that only a part of the mold cavity is filled;

(b) cooling the injected first plastic material in the mold cavity;

(c) injecting subsequent to injecting the first plastic material, a second plastic material into the mold cavity so that the cooled injected first plastic material extending between the core section and the cavity section in said part of the mold cavity is sufficiently solidified to stabilize the core section in relation to the cavity section by impeding movement of the core section in relation to the cavity section caused by injecting the second plastic material, whereby the injected second plastic material fills the mold cavity; and (d) cooling the injected plastic material in the mold cavity to thereby solidify the product;

the method being characterized by the following additional steps, step (a) comprising the step of:

(e) continuing the injection of the first plastic material by the second plastic material without intermission;

step (b) comprising the step of:

(f) cooling a portion of the first plastic material so that it is at least partially solidified and so that another portion of the first plastic material remains fluid;

step (c) comprising the step of:

(g) injecting the second plastic material so that the second plastic material displaces some of the fluid first plastic material to thereby provide at least one flow path for the second plastic material to fill the mold cavity and so that some of the at least partially solidified first plastic material stabilizes the core section in relation to the cavity section.

2. A method according to claim 1, wherein no retractable portion of the core section and/or the cavity section is withdrawn in order to create at least one flow path for the second plastic material to fill the mold cavity.

3. A method according to claim 1, wherein step (a) comprises the step of:
(h) injecting the first plastic material so that the injected first plastic material does not completely cover the parting line; and
wherein step (c) comprises the step of:
(i) injecting the second plastic material so that the injected second plastic material fills the mold cavity to thereby completely cover the parting line.

4. A method according to claim 1, wherein step (f) comprises the steps of:
(h) cooling said portion of the first plastic material so that it is at least partially solidified by molding said portion in a relatively thin wall thickness;
(i) cooling a portion of the first plastic material so that another portion of the first plastic material remains fluid by molding said portion in a relatively thick wall thickness.

5. A method according to claim 1, wherein the first plastic material has the same chemical composition as the second plastic material.

6. A method according to claim 1, wherein the first plastic material is injected into the mold cavity via at least one gate, and wherein the second plastic material is injected into the mold cavity via the same at least one gate.

7. A method according to claim 1, wherein no use is made of multiple gates, in order to create at least one flow path for the second plastic material to fill the mold cavity.

8. A method according to claim 1, wherein no use is made of temporary cavity-section-to-free-end-of-core-section contact during the molding cycle.

9. A method according to claim 1, wherein no use is made of any of throttles, valves and reduced throats between the core section and the cavity section of the mold cavity.

10. A method according to claim 1 for controlling the dimensions of an injection molded hollow plastic product having laminated walls, wherein the mold cavity contains a previously injected plastic product when first and second plastic material is injected so that one said wall includes the previously injected plastic product.

11. A method of reducing the clamping force required to produce a plastic product injection molded within the cavity of a mold having a first mold section and a second mold section defining the mold cavity therebetween and separated by a parting line, comprising
(a) injecting a first plastic material into the mold cavity so that only a part of the mold cavity is filled;
(b) cooling the injected first plastic material in the mold cavity to solidify a portion of the first plastic material in a section of the mold cavity extending between the first mold section and the second mold section;
(c) injecting a second plastic material under pressure into the mold cavity subsequent to solidifying said portion of the first plastic material, so that the cooled injected first plastic material in said section of the mold cavity impedes transmission of injection pressure caused by injecting the second plastic material to thereby reduce during injection of the second plastic material the clamping force required to overcome forces that tend to separate the first and second mold sections as a result of injection pressure, whereby the injected second plastic material fills the mold cavity; and
(d) cooling the injected plastic material in the mold cavity to thereby solidify the product;
the method being characterized by the following additional steps,
step (a) comprising the step of:
(e) continuing the injection of the first plastic material by the second plastic material without intermission;
step (b) comprising the step of:
(f) cooling a portion of the first plastic material so that it is at least partially solidified and so that another portion of the first plastic material remains fluid;
steps (c) comprising the step of:
(g) injecting the second plastic material so that the second plastic material displaces some of the fluid first plastic material to thereby provide at least one flow path for the second plastic material to fill the mold cavity and so that some of the at least partially solidified first plastic material impedes transmission of injection pressure causing separative forces of the first mold section in relation to the second mold section.

12. A method according to claim 11, wherein no retractable portion of the first mold section and/or the second mold section is withdrawn in order to create at least one flow path for the second plastic material to fill the mold cavity.

13. A method according to claim 11, wherein step (a) comprises the step of:
(h) injecting the first plastic material so that the injected first plastic material does not completely cover the parting line; and
wherein step (c) comprises the step of:
(i) injecting the second plastic material so that the injected second plastic material fills the mold cavity to thereby completely cover the parting line.

14. A method according to claim 11, wherein step (f) comprises the steps of:
(h) cooling said portion of the first plastic material so that it is at least partially solidified by molding said portion in a relatively thin wall thickness;
(i) cooling a portion of the first plastic material so that another portion of the first plastic material remains fluid by molding said portion in a relatively thick wall thickness.

15. A method according to claim 11, wherein the first plastic material has the same chemical composition as the second plastic material.

16. A method according to claim 11, wherein the first plastic material is injected into the mold cavity via at least one gate, and wherein the second plastic material is injected into the mold cavity via the same at least one gate.

17. A method according to claim 11, wherein no use is made of multiple gates, in order to create at least one flow path for the second plastic material to fill the mold cavity.

18. A method according to claim 11, wherein no use is made of temporary cavity-section-to-free-end-of-core-section contact during the molding cycle.

19. A method according to claim 11, wherein no use is made of any of throttles, valves and reduced throats between the first mold section and the second mold section of the mold cavity.

20. A method according to claim 1 for reducing the clamping force required when injection molding a hollow plastic product having laminated walls, wherein the mold cavity contains a previously injected plastic product when first and second plastic material is injected so that one said wall includes the previously injected plastic product.

* * * * *